UNITED STATES PATENT OFFICE.

LUDWIG TAUB AND HANS HAHL, OF ELBERFELD, GERMANY, ASSIGNORS TO FARBENFABRIKEN VORM. FRIEDR. BAYER & CO., OF ELBERFELD, GERMANY, A CORPORATION OF GERMANY.

GLYCOL ESTER OF BENZOIC ACID.

1,014,859. Specification of Letters Patent. Patented Jan. 16, 1912.

No Drawing. Application filed May 17, 1911. Serial No. 627,813.

*To all whom it may concern:*

Be it known that we, LUDWIG TAUB and HANS HAHL, doctors of philosophy, chemists, citizens of the German Empire, residing at Elberfeld, Germany, have invented new and useful Improvements in Glycol Esters of Benzoic Acid, of which the following is a specification.

We have found that the new benzoic ester of glycol $C_6H_5$—COO—$CH_2$—$CH_2$—OH can be obtained by esterification of benzoic acid with glycol. The new ester has proved to be an excellent remedy against scabies. It possesses the advantage over Peru balsam hitherto used for this purpose that it is odorless, non-irritant and easily soluble.

In order to illustrate the new process more fully the following example is given, the parts being by weight: 142 parts of the sodium salt of benzoic acid are heated with 80.5 parts of glycol chlorhydrin in an oil-bath during 4 hours to 145° C. When the solution is cooled ether is added to it and the ethereal solution is washed with soda and water. After drying the ether is distilled off and the residue is fractionated *in vacuo*. The ester boils at 176–180° C. under a pressure of 20 mm. It is a colorless crystalline substance melting at 45° C.

We claim:—

The herein described glycol benzoic acid ester of the formula $C_6H_5$—COO—$CH_2$—$CH_2$—OH which is a colorless crystalline substance melting at 45° C. and being a valuable remedy against scabies, substantially as described.

In testimony whereof we have hereunto set our hands in the presence of two subscribing witnesses.

LUDWIG TAUB. [L. S.]
HANS HAHL. [L. S.]

Witnesses:
CHAS. J. WRIGHT,
ALFRED HENKEL.